(12) United States Patent  
Neser

(10) Patent No.: US 11,153,474 B2
(45) Date of Patent: Oct. 19, 2021

(54) AUTOMATED SCOPE LIMITING FOR VIDEO ANALYTICS

(71) Applicant: UBICQUIA IQ LLC, Melbourne, FL (US)

(72) Inventor: Morne Neser, Québec (CA)

(73) Assignee: Ubicquia IQ LLC, Fort Lauderdale, FL (US)

( * ) Notice: Subject to any disclaimer, the term of this patent is extended or adjusted under 35 U.S.C. 154(b) by 0 days.

(21) Appl. No.: 16/958,657

(22) PCT Filed: Dec. 27, 2018

(86) PCT No.: PCT/US2018/067749
§ 371 (c)(1),
(2) Date: Jun. 26, 2020

(87) PCT Pub. No.: WO2019/133755
PCT Pub. Date: Jul. 4, 2019

(65) Prior Publication Data
US 2021/0067680 A1    Mar. 4, 2021

Related U.S. Application Data

(60) Provisional application No. 62/610,596, filed on Dec. 27, 2017.

(51) Int. Cl.
*H04N 5/232* (2006.01)
*G06K 9/00* (2006.01)
*H04N 5/247* (2006.01)
*H04N 5/77* (2006.01)
*H04N 7/18* (2006.01)
(Continued)

(52) U.S. Cl.
CPC ..... *H04N 5/23203* (2013.01); *G06K 9/00758* (2013.01); *G06K 9/00771* (2013.01); *G06K 9/209* (2013.01); *G06K 9/3233* (2013.01); *H04N 5/247* (2013.01); *H04N 5/772* (2013.01);
(Continued)

(58) Field of Classification Search
CPC .................................................. G06K 9/00771
See application file for complete search history.

(56) References Cited

U.S. PATENT DOCUMENTS 9,811,885 B2    11/2017    Bocharov et al.
9,830,511 B2    11/2017    Saptharishi et al.
(Continued)

FOREIGN PATENT DOCUMENTS

WO    2015/157757 A2    10/2015

*Primary Examiner* — Paulos M Natnael
(74) *Attorney, Agent, or Firm* — Daniel C. Crilly; Thomas J. Satagaj

(57) ABSTRACT

Provided is a method and system including at least one imaging device disposed within an area to be monitored, and configured to capture one or more images and video segments of the area; a computing device in communication with the imaging device, that transmits and receive data to and from the at least one imaging device, performs video analytics to detect objects, compares between different video segments (i.e., frames) and still images within a plurality of time lapse periods of the area to be monitored, and selects different video segments and still images to be captured of the area, by the at least one imaging device, and parameters to determine the video analytics to be performed, based on the results of the comparison.

11 Claims, 3 Drawing Sheets

(51) Int. Cl.
*G06K 9/20* (2006.01)
*G06K 9/32* (2006.01)

(52) U.S. Cl.
CPC ......... *H04N 7/181* (2013.01); *G06K 9/00785* (2013.01); *H04N 5/23299* (2018.08)

(56) References Cited

U.S. PATENT DOCUMENTS

| | | | |
|---|---|---|---|
| 2005/0058321 A1* | 3/2005 | Buehler | G06T 7/277 |
| | | | 382/103 |
| 2010/0013656 A1* | 1/2010 | Brown | G08B 13/19613 |
| | | | 340/686.6 |
| 2010/0013931 A1* | 1/2010 | Golan | G06T 7/70 |
| | | | 348/150 |
| 2011/0025847 A1* | 2/2011 | Park | H04N 7/181 |
| | | | 348/143 |
| 2011/0228101 A1 | 9/2011 | Miksch | |
| 2016/0253883 A1 | 9/2016 | Westmacott et al. | |
| 2017/0077764 A1* | 3/2017 | Bell | H02J 7/027 |
| 2018/0101960 A1* | 4/2018 | Boonyasiriwat | G06K 9/00771 |
| 2018/0232592 A1* | 8/2018 | Stewart | G08B 13/19606 |
| 2019/0278976 A1* | 9/2019 | Khadloya | G06K 9/6262 |

* cited by examiner

AUTOMATED SCOPE LIMITING FOR VIDEO ANALYTICS

I. TECHNICAL FIELD

The present invention relates generally to performing video analytics within a system. In particular, the present invention relates to identifying a region of interest for video analytics to be performed within a system (e.g., determining video analytics to be performed in a vehicle parking or traffic system).

II. BACKGROUND

Image and video analytics are used to determine actions to be taken to prevent problems and improve operations in selected systems (e.g., traffic monitoring systems, parking systems etc.). For example, in parking systems, image and video analytics can be used to determine whether vacant parking spaces are available. These analytics can also be used to determine whether a vehicle has been parked illegally, or stolen.

Conventional systems used in the scenarios described above, capture and process still images or video from various vantage-points. These images and videos are analyzed and the resulting analytics are reviewed to determine parking availability, theft or illegal parking.

In the conventional systems, however, optimization is often required to improve performance and speed on restricted hardware. This may include using smaller/simpler detection systems (Bayesian object detection e.g. optimized neural networks, support vector machines), limiting the detection capabilities as required for each individual camera scenario, e.g.:

limiting the area of the image to be processed to a predefined region of interest e.g. parking zones, road lanes, side-walks & pedestrian crossings limiting detection to specific types of objects adjusting certain detection probability thresholds assuming a predefined orientation and size of the objects to be detected reducing the frame rate of processing, depending on the expected speed/change rate of detected objects e.g. parking statistics These optimization parameters are typically configured manually for individual cameras in a "commissioning" process before putting the system in operation.

III. SUMMARY OF THE EMBODIMENTS

Given the aforementioned deficiencies, needed is a system and method for automatically identifying an appropriate region of interest, frame rate, zoom level, and/or orientation for predetermining video analytics to be performed within a system. For example, the system and method of the present invention can determine where, in a region of interest, a system should perform parked vehicle detection, versus where a system should perform vehicle traffic or pedestrian traffic analytics, versus which areas in the region of interest can be ignored, for example, by reason of no activity.

In embodiments of the present invention, a system is provided including at least one imaging device disposed within an area to be monitored, and configured to capture one or more images and video segments of the area, a computing device in communication with the imaging device, and configured to transmit and receive image data to and from the at least one imaging device, perform non-operational video analytics to detect objects in the image data, compare between video segments (e.g., frames) and still images of the image data within predefined time lapse periods of the area, and based on the results of the comparison, determine parameters for camera-specific-optimized (e.g., scope limiting and/or attention focusing) video analytics to be performed. As used herein, "non-operational" video analytics may refer to slower, unrestricted object detection algorithms, background subtraction, image segmentation, line detection, optical flow, motion estimation, and/or object tracking. The non-operational video analytics may be performed in an automated mode (e.g., an automated commissioning mode) to detect objects. Such an automated non-operational mode is distinct from a normal operational mode, and is aimed at finding, learning, or adjusting the scope-limiting parameters (and potential detection thresholds) of the operational video analytics, as needed by individual systems.

Such an non-operational mode may be executed prior to, or interlaced with, or concurrently with, an operational mode.

Other embodiments provide a method for automatically monitoring the history/statistics of outputs of operational mode video analytics to adjust the desired parameters for optimized video analytics; or determining a need to re-perform a commissioning process, based on e.g. inactivity due to changed parking layouts, trees, weather etc.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 1:
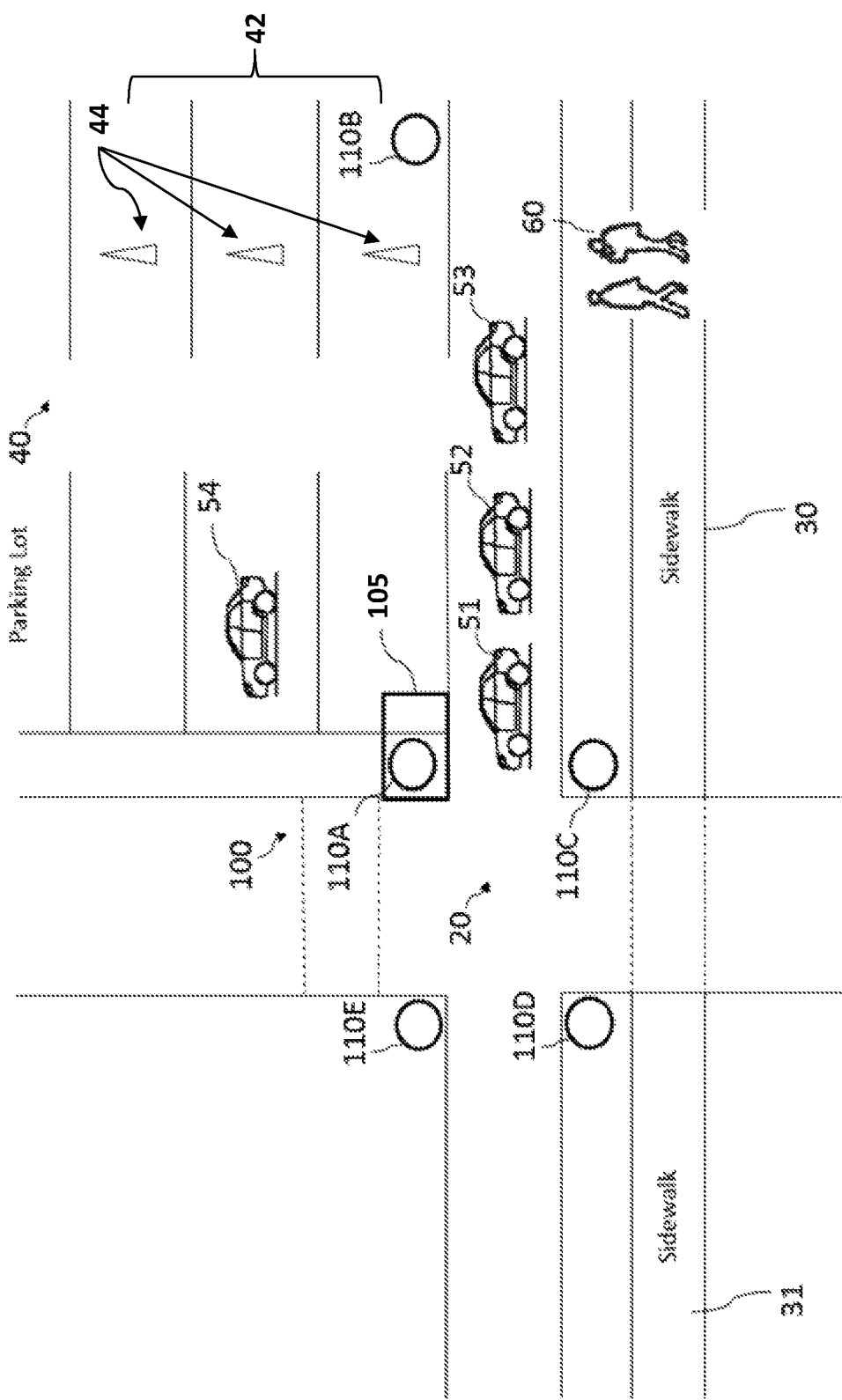
FIG. 1 is a schematic illustrating a parking and traffic system implementing a system for automatically identifying video analytics to be performed in accordance with embodiments of the present invention.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, apparatuses, materials, or methods that are known to those having ordinary skill in the art have not been described in detail in order to avoid obscuring a description of embodiments of the present invention. Therefore, specific structural and functional details disclosed herein are not to be interpreted as limiting, but merely as a basis for the claims and as a representative basis for teaching one skilled in the art.

As noted above, the embodiments provide a method and system for automatically identifying video analytics to be performed in an applicable system (e.g., a parking or traffic monitoring system). This method can be performed within an imaging device (e.g., a camera device) or over a communication network by an external system. The communication network can be a network such as WiFi, Internet, Bluetooth, 802.11, 802.15 and cellular networks. The embodiments of the present invention will now be discussed with reference to FIGS. 1 and 2.

As shown in FIG. 1, a system 100 can be implemented at an intersection 20, at sidewalks 30 and 31 and within a parking lot 40, for example. The present invention, however, is not limited to being implemented within any particular type of system. Additional types of systems for which the disclosed invention can be implemented, would be recognized by persons of ordinary skill in the art.

The system 100 includes one or more traffic lights 105, and imaging devices 110A, 110B, 110C, 110D, and 110E which are positioned in close proximity to the intersection 20, the sidewalks 30 and 31, and the parking lot 40. The imaging devices 110A, 110B, 110C, 110D, and 110E can be disposed within existing lighting fixtures, such as the lighting fixture 105, or as standalone devices for the purpose set forth herein.

As shown in FIG. 1, vehicles 51, 52, 53 are depicted as traveling along a street in the direction of the intersection 20. Additionally, individuals 60 can be walking along the sidewalk 30 in the direction of the intersection 20. Further, vehicle 54 can be parked within the parking lot 40. The imaging devices 110A, 110B, 110C, 110D, and 110E are configured to capture video segments and still images during periods of activity within the parking lot 40. The imaging devices can also capture traffic traveling through the intersection 20, and pedestrian traffic moving along the sidewalks 30 and 31.

More specifically, in FIG. 1, the imaging devices 110A, 110B, 110C, 110D, and 110E are configured to detect and capture images of the areas 20, 30, 31 and 40. The image and video data captured by the imaging devices 110A, 110B, 110C, 110D, and 110E is used to automatically produce data, representative of activities of interest, via a system 200 (shown in FIG. 2). These activities, for example, relate to monitoring the traffic at the intersection 20, the availability of vacant parking spaces within the parking lot 40, and pedestrian traffic moving along the sidewalk 30.

Figure 2:
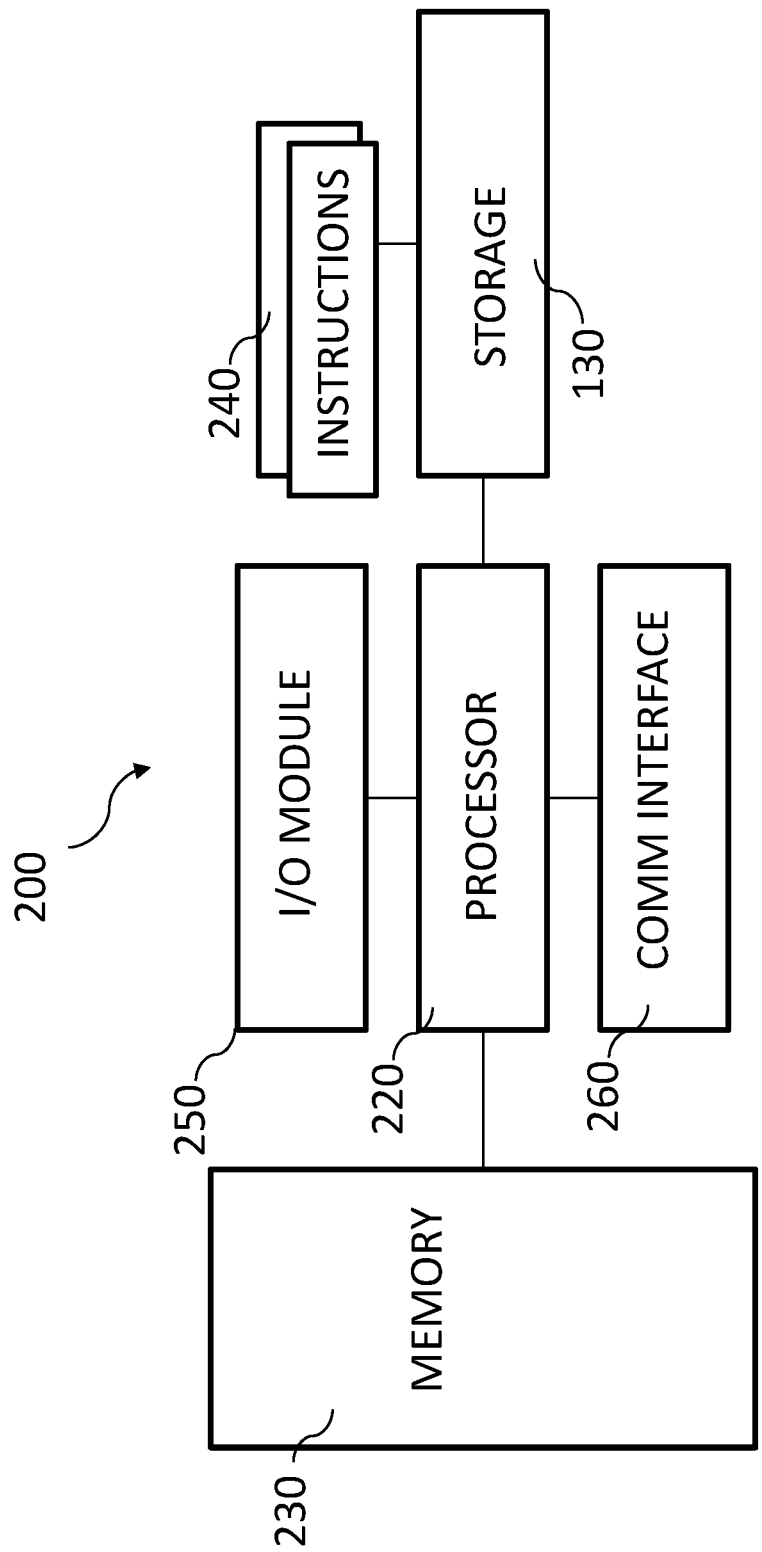
FIG. 2 is a block diagram illustrating an exemplary system for automatically identifying video analytics to be performed as shown in FIG. 1 in accordance with the embodiments.

FIG. 2 is a block diagram illustrating an exemplary system 200 for automatically identifying video analytics to be performed as shown in FIG. 1 in accordance with the embodiments. The system 200 can be included within one or more of the devices depicted in FIG. 1, such as the traffic light 105. Alternatively, the system 200 can be a completely separate standalone system in communication with the imaging devices 110A, 110B, 110C, 110D, and 110E and lighting fixtures. Also the system 200 can be completely external to and remote from the system 100, such as being part of a remote server. Software for analyzing the data above, and producing analytics therefrom, is executed within the system 200.

The data associated with the video segments and still images is transmitted to a processor (e.g., processor 220 as depicted in FIG. 2) for analysis. By way of example and not limitation, as described above, the processor 220 can be located within an external monitoring system or within the lighting fixture 105 or other devices or equipment.

By way of example, video analytics can occur and detection processes can be performed within the processor 220 to detect objects (e.g., vehicles 51, 52, 53 and 54) or people (e.g., individuals 60). According to the embodiments, at least a portion of the video analytics and detection processes can include Bayesian object detection, optical flow, image segmentation, background subtraction, and video tracking. The present invention, however, is not limited to any particular type, or number, of detection or analytics processes being performed.

A comparison operation can also be performed between different video segments (i.e., frames) and still images of areas within various time lapse periods are performed.

Based on the results of the comparison operation, different video segments and still images of areas of interests are selected and parameters are determined to select the type of analysis to be performed within the system 200, and to create a configuration file with configuration specifications for the video analytics to be produced.

The configuration specifications are used by the processor 220 to configure the imaging devices 110A, 110B, 110C, 110D, and 110E to capture the desired still images and/or video segments based on the configuration file.

For example, as shown in FIG. 1, parking spaces 42 on one side of the parking lot 40 are blocked, denoted by the presence of cones 44. Thus, there are no available parking spaces one that side of the parking lot 40. Further, there is no pedestrian traffic along sidewalk 31. Accordingly, the resulting configuration file may include instructions to not receive video segments or still images from the imaging device 110D, adjacent to sidewalk 31, or from the imaging device 110B disposed adjacent to the blocked parking spaces 42 within the parking lot 40.

Alternatively, the configuration file may include instructions to adjust the respective imaging devices 110B and 110D to capture still images and video segments of the intersection 20 or sidewalk 30, or the other side of the parking lot 40, respectively. Even further, time lapsed periods between capturing the still images and/or video segments can be adjusted based on a parking history, and/or an intersection traffic or pedestrian traffic history, in real-time. Therefore, use of the system 200 of the present invention can improve the effectiveness of the monitoring systems by improving the selection of the video data to be captured and analyzed, and resulting analytics to be produced.

The system 200 of FIG. 2 can be a computing device that includes the processor 220 having a specific structure. The specific structure is imparted to the processor 220 by instructions stored in an internal memory 230 included therein. The structure can also be imparted by instructions 240 that can be fetched by the processor 220 from a storage medium 130. The storage medium 130 may be co-located with the system 200 as shown, or it may be located elsewhere and be communicatively coupled to the system 200.

The system 200 may include one or more hardware and/or software components configured to fetch, decode, execute, store, analyze, distribute, evaluate, diagnose, and/or categorize information. Furthermore, the system 200 can include an (input/output) I/O module 250 that can be configured to interface with a plurality of remote devices including imaging devices (e.g., imaging device 110A) and sensors. The system 200 is calibrated during installation so that sensor detection corresponds to a known physical location (e.g., geo-location on a map).

The processor 220 may include one or more processing devices or cores (not shown). In some embodiments, the processor 220 can be a plurality of processors, each having either one or more cores. The processor 220 can be configured to execute instructions fetched from the memory 230, or the instructions may be fetched from storage medium 130, or from a remote device connected to computing device via a communication interface 260.

Furthermore, without loss of generality, the storage medium 130 and/or the memory 230 may include a volatile or non-volatile, magnetic, semiconductor, tape, optical, removable, non-removable, read-only, random-access, or any type of non-transitory computer-readable computer medium. The storage medium 130 and/or the memory 3040 may include programs and/or other information that may be used by the processor 220.

Moreover, the storage medium 130 may be configured to log data processed, recorded, or collected during the operation of the computing device 200. For example, the storage medium 130 may store historical patterns of the data captured by the imaging devices 110A, 110B, 110C, 110D, and 110E. The data may be time-stamped, location-stamped, cataloged, indexed, or organized in a variety of ways consistent with data storage practice.

Figure 3:
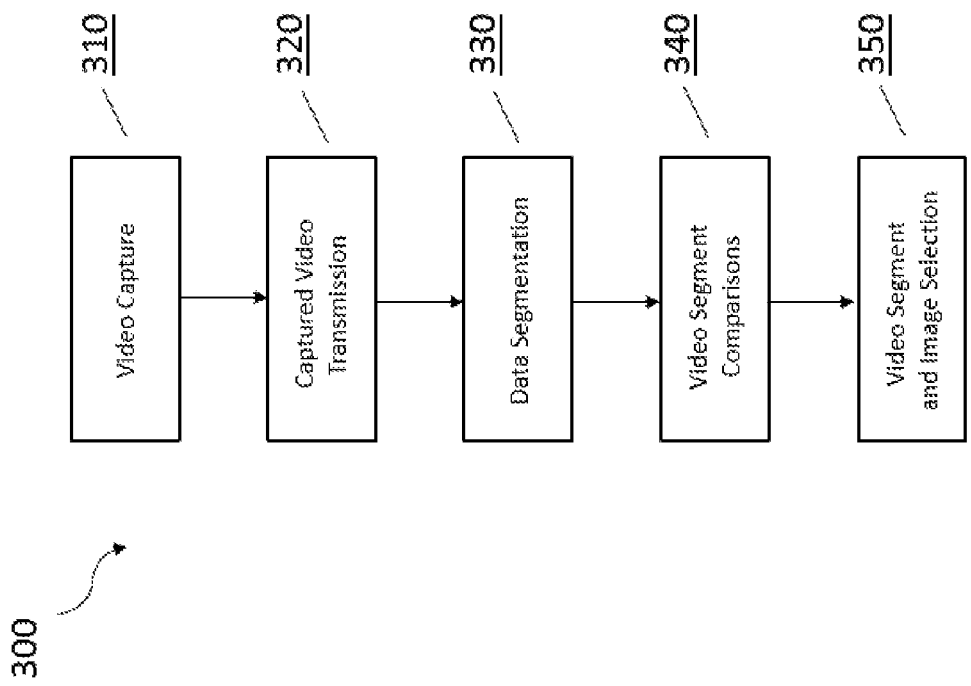
FIG. 3 is a flow diagrams illustrating a an exemplary method for automatically identifying video analytics to be performed that can be implemented within the embodiments.

FIG. 3 is a flow diagram illustrating in exemplary method 300 for automatically identifying video analytics to be performed that can be implemented within one or more embodiments of the present invention. The method 300 can be implemented within various types of systems for example, traffic or pedestrian systems, and parking systems.

The method 300 begins at operation 310, where one or more cameras capture video segments and still images. The video segments can be for predetermined periods of time (e.g., 5, 10 or 30 minute segments). From operation 310, the process continues to operation 320, where the data associated with the video segments and still images is transmitted to a processor for further analysis. According to one or more embodiments, the processor can be located within an external monitoring system or within the lighting fixtures or other devices or equipment of a system.

The process then continues to operation 330 where video analytics is performed and detection processes are performed to detect objects or people. According to embodiments of the present invention, some of the video analytics and detection processes performed can include Bayesian object detection, optical flow, image segmentation, background subtraction and video tracking. The present invention is not limited to any particular type or number of detection or analytics processes being performed.

From operation 330, the process continues to operation 340, where comparison between different video segments (i.e., frames) and still images of areas within various time lapse periods are performed.

In operation 350, based on the results of the comparison operation in operation 340, different video segments and still images of areas of interests are selected and parameters are determined based on the type of analytics that should be run within the system to create a configuration file with specific configuration specifications for the video analytics to be performed. The process then returns to operation 310 where the capturing of still images and video segments is performed based on the new configuration file.

Embodiments of the present invention provide the advantages of determining the areas of interests in which video analytics should be performed within systems; and the appropriate types of video analytics to be performed which save time and costs by not focusing on areas that are not of interests, for example, areas where no cars are parked over a 30 minute period in a parking garage.

This written description uses examples to disclose the invention including the best mode, and also to enable any person skilled in the art to practice the invention, including making and using any devices or apparatuses and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a plurality of imaging devices disposed within an area to be monitored, each imaging device of the plurality of imaging devices being operable to capture one or more images, video segments, or images and video segments of the area;
   a computing device integrated into a first imaging device of the plurality of imaging devices, the first imaging device in communication with each of the other imaging devices of the plurality of imaging devices, and the computing device including a processor configured to:
      access respective image data captured separately by each imaging device of the plurality of imaging devices;
      perform non-operational video analytics to detect objects in the respective image data;
      compare detected objects in the respective image data over predefined time lapse periods;
      based on results of the comparisons, determine parameters for respective configuration files for the plurality of imaging devices, each configuration file being for a respective imaging device of the plurality of imaging devices and including parameters for performing at least one of adjusting a position of the respective imaging device to focus image capture on particular areas of interest, disabling a transfer of image data to the computing device, and modifying time periods of image capture; and
      direct communication of each of the configuration files to the respective imaging device of the plurality of imaging devices.

2. The system of claim 1, wherein comparison of detected objects within the respective image data over a predefined time lapse period indicates an absence of certain activity in a particular portion of the area over the predefined time lapse period.

3. The system of claim 1, wherein the non-operational video analytics to detect objects in the respective image data comprises at least one of Bayesian object detection, optical flow, image segmentation, background subtraction and object tracking.

4. The system of claim 1, further comprising:
a storage medium configured to store image data and instructions to be performed by the processor.

5. The system of claim 1, further comprising:
a communication interface configured to receive respective image data from at least some of the plurality of imaging devices, and further configured to communicate respective configuration files to at least some of the plurality of imaging devices.

6. The system of claim 5, wherein the communication interface is arranged to wirelessly communicate information between the plurality of imaging devices.

7. A method to automatically configure video analytics performance of a plurality of imaging devices disposed within an area to be monitored, the method comprising:
accessing, by a processor integrated in a first imaging device of the plurality of imaging devices, respective image data captured by each imaging device of the plurality of imaging devices, the respective image data including one or more images, video segments, or images and video segments of the area to be monitored;
performing non-operational video analytics, by the processor integrated in the first imaging device, to detect objects in the respective image data;
comparing the detected objects within the respective image data over a plurality of time lapse periods;
based on results of the comparisons, determining parameters for respective configuration files for the plurality of imaging devices, each configuration file being for a respective imaging device of the plurality of imaging devices and including parameters for performing at least one of adjusting a position of the respective imaging device to focus image capture on particular areas of interest, disabling a transfer of image data to the computing device, and modifying time periods of image capture; and
communicating each of the configuration files to the respective imaging device of the plurality of imaging devices.

8. The method of claim 7, further comprising:
storing image data in a storage medium of the first imaging device.

9. A device comprising:
an imaging device arranged for deployment within an area to be monitored, the imaging device being operable to capture one or more images, video segments, or images and video segments of the area;
a computing device communicatively coupled to the imaging device and arranged for communication with a plurality of other imaging devices, the computing device including a processor configured to:
access respective image data captured separately by the imaging device and each of the plurality of other imaging devices;
perform non-operational video analytics to detect objects in the respective image data;
compare detected objects in the respective image data over predefined time lapse periods; and
based on results of the comparisons, determine parameters for respective configuration files for the imaging device and the plurality of other imaging devices, each configuration file being for a respective imaging device and including parameters for performing at least one of adjusting a position of the respective imaging device to focus image capture on particular areas of interest, disabling a transfer of image data to the computing device, and modifying time periods of image capture.

10. The device of claim 9, further comprising:
a geo-location device arranged to generate location data associated with at least some of the respective image data captured by the imaging device.

11. The device of claim 9, wherein the processor is further configured to:
communicate respective configuration files to the plurality of other imaging devices.

* * * * *